(12) United States Patent
Merkel

(10) Patent No.: US 6,413,895 B1
(45) Date of Patent: Jul. 2, 2002

(54) REFRACTORY NZP-TYPE STRUCTURES AND METHOD OF MAKING AND USING SAME

(75) Inventor: Gregory A. Merkel, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 118 days.

(21) Appl. No.: 09/671,722

(22) Filed: Sep. 27, 2000

Related U.S. Application Data (60) Provisional application No. 60/157,895, filed on Oct. 5, 1999.

(51) Int. Cl.[7] .................. C04B 35/03; C04B 35/16; C04B 35/20; C04B 35/22; C04B 35/46

(52) U.S. Cl. .................. 501/134; 501/80; 501/81; 501/135; 501/136; 501/152; 501/154; 428/116; 264/177.12; 55/523; 55/DIG. 30; 60/311; 95/273

(58) Field of Search .................. 501/80, 81, 134, 501/135, 136, 152, 154; 428/116; 264/177.12; 55/523, DIG. 30; 60/311; 95/273

(56) References Cited

U.S. PATENT DOCUMENTS

| | | | |
|---|---|---|---|
| 4,455,180 A | * | 6/1984 | Hillman et al. |
| 4,675,302 A | | 6/1987 | Roy et al. |
| 4,751,206 A | | 6/1988 | Yamai et al |
| 4,781,831 A | | 11/1988 | Goldsmith |
| 4,801,566 A | | 1/1989 | Limaye et al. |
| 4,925,816 A | | 5/1990 | Watanabe et al. |
| 4,968,648 A | | 11/1990 | Watanabe et al. |
| 5,009,781 A | | 4/1991 | Goldsmith |
| 5,102,836 A | | 4/1992 | Brown et al. |
| 5,108,601 A | | 4/1992 | Goldsmith |
| 5,128,288 A | | 7/1992 | Ohashi et al. |
| 5,167,885 A | | 12/1992 | Rice et al. |
| 5,217,934 A | * | 6/1993 | Matsuhiro et al. .......... 501/106 |
| 5,254,510 A | | 10/1993 | Matsuhiro et al. |
| 5,488,018 A | | 1/1996 | Limaye |
| 6,187,700 B1 | * | 2/2001 | Merkel ................... 501/32 |
| 6,238,779 B1 | * | 12/2001 | He et al. ................ 55/523 |

OTHER PUBLICATIONS

C.Y. Huang, PhD thesis, Pennsylvania State University, May 1990, p. 9.

E. Breval and D. Agrawal, "Thermal expansion characteristics of [NZP], NaZr2P3O12–type materials: a Review", 1995 The Institute of Materials, pp.27–32.

* cited by examiner

*Primary Examiner*—David Sample
(74) *Attorney, Agent, or Firm*—L. Rita Herzfeld; Anca C. Gheorghiu (57) ABSTRACT

A structure made predominately of an NZP-type phase having the general formula $R_xZ_4P_{6-y}Si_yO_{24}$, where $0 \leq x \leq 8$, $0 \leq y \leq 6$, R is Li, Na, K, Rb, Cs, Mg, Ca, Sr, Ba, Y, and/or lanthanides, and Z is Zr, Ti, Nb, Ta, Y, and/or lanthanidess, and optionally a sintering additive. The structure has an open porosity of at least 20% by volume, median pore diameter in micrometers of at least a value defined by the quantity [10–0.10(% open porosity)], both as measured by mercury porosimetry, and four-point modulus of rupture as measured on a solid rod of circular cross section, of at least 300 psi. Method of making the structure involves forming a mixture of NZP-forming raw material powders that are metal oxide sources capable of reacting to form an NZP-type reaction product, and/or pre-reacted powder having the above general formula. The volumetric average of the median particle diameters of the raw material powders in the raw materials combination is at least 15 micrometers, and the particle diameters of at least 65% by volume of the totality of the raw material particles are greater than 11 micrometers. The mixture is shaped into a green structure, and fired to produce the finished structure. The structure is preferably multicellular, e.g. a honeycomb, where a fluid stream enters the structure, passes through the cells and is acted upon, and exits the structure. The structure is preferably an alternately plugged honeycomb suitable as a diesel particulate filter.

62 Claims, 1 Drawing Sheet

Figure 1

REFRACTORY NZP-TYPE STRUCTURES AND METHOD OF MAKING AND USING SAME

This application claims the benefit of U.S. Provisional Application Ser. No. 60/157,895, filed Oct. 5, 1999, entitled "Refractory NZP-Type Structures and Method of Making and Using Same", by Gregory A. Merkel.

FIELD OF THE INVENTION

This invention relates to NZP type structures of high permeability suitable for use in filtration applications such as in diesel particulate filtration.

BACKGROUND OF THE INVENTION

Refractory NZP bodies are suitable for use in high temperature applications due to their high melting point and low coefficient of thermal expansion.

Present methods of making such bodies are disclosed in U.S. Pat. Nos. 4,675,302, 4,751,206, 4,801,566, 4,925,816, 5,102,836, 5,128,288, 5,254,510, and 5,488,018. Such bodies are expected to have low permeability due to low porosity or fine pore size; or in other cases, to have porosities and pore sizes so large that the bodies would be expected to exhibit poor filtration efficiency in removal of particles from a gas stream.

A need therefore exists to have low thermal expansion refractory NZP-type bodies with higher permeability than has been achieved up to now, while at the same time with useful filtration efficiency.

The present invention provides such a body and a method of making and using it.

SUMMARY OF THE INVENTION

In accordance with one aspect of the invention, there is provided a structure made predominately of an NZP-type phase having the general formula $R_xZ_4P_{6-y}Si_yO_{24}$, where $0 \leq x \leq 8$, $0 \leq y \leq 6$, R is Li, Na, K, Rb, Cs, Mg, Ca, Sr, Ba, Y, and/or lanthanides, and Z is Zr, Ti, Nb, Ta, Y, and/or lanthanides, and optionally a sintering additive. The structure has an open porosity of at least 20% by volume, a median pore diameter in micrometers equal to or greater than a value defined by the quantity [10−0.10(% open porosity)], both as measured by mercury porosimetry, and four-point modulus of rupture as measured on a solid rod of circular cross section, of at least 300 psi.

In accordance with another aspect of the invention, there is provided a method of making the structure that involves forming a mixture of NZP-forming raw material powders that are metal oxide sources capable of reacting to form an NZP-type reaction product, and/or pre-reacted powder having the above general formula. The volumetric average of the median particle diameters of the raw material powders in the raw materials combination is at least 15 micrometers, and the particle diameters of at least 65% of the totality of the raw material particles are greater than 11 micrometers. The mixture is shaped into a green structure, and fired to produce the finished structure.

The structure is preferably multicellular, e.g. a honeycomb, and most preferably an alternately plugged honeycomb suitable for use as a diesel particulate filter.

In accordance with another aspect of the invention, there is provided a method of removing particulates from a fluid stream that involves passing the stream through an alternately plugged honeycomb to retain the particulates in the pores of the honeycomb.

DETAILED DESCRIPTION OF THE INVENTION

The present invention relates to a refractory ceramic structure or body which is predominately an "NZP-type" phase. By "NZP-type" phase is meant a solid phase in which the arrangement of atoms is generally similar to that of the type compound $NaZr_2P_3O_{12}$, but in which some or all of the sodium, zirconium, or phosphorus is replaced by other substituent atoms. Also, additional atoms may be substituted into the crystal lattice sites that are vacant in $NaZr_2P_3O_{12}$, but which are fully occupied in the $Na_4Zr_2Si_3O_{12}$ compound, which is also an NZP-type phase.

The NZP-type phase is of the general formula $R_xZ_4P_{6-y}Si_yO_{24}$, where $0 \leq x \leq 8$, $0 \leq y \leq 6$, R is one or more of the elements Li, Na, K, Rb, Cs, Mg, Ca, Sr, Ba, Y, and lanthanides, and Z is one or more of the elements Zr, Ti, Nb, Ta, Y, and lanthanides. Cations are selected to maintain charge balance.

The structure composition can also optionally contain a sintering additive. The sintering additive is generally an oxide source of one or more metals such as magnesium, zinc, calcium, aluminum, lanthanum, titanium, bismuth, or tungsten. Preferably the sintering additive makes up about 0.05% to 1.0% by weight of the structure.

An advantage of the present invention is that the inventive structures exhibit high permeability by virtue of high, interconnected porosity and large median pore size, making them suitable in filtration applications. Open porosity reported as volume percent and pore size reported as median pore diameter in micrometers are measured by mercury porosimetry.

Figure 1:
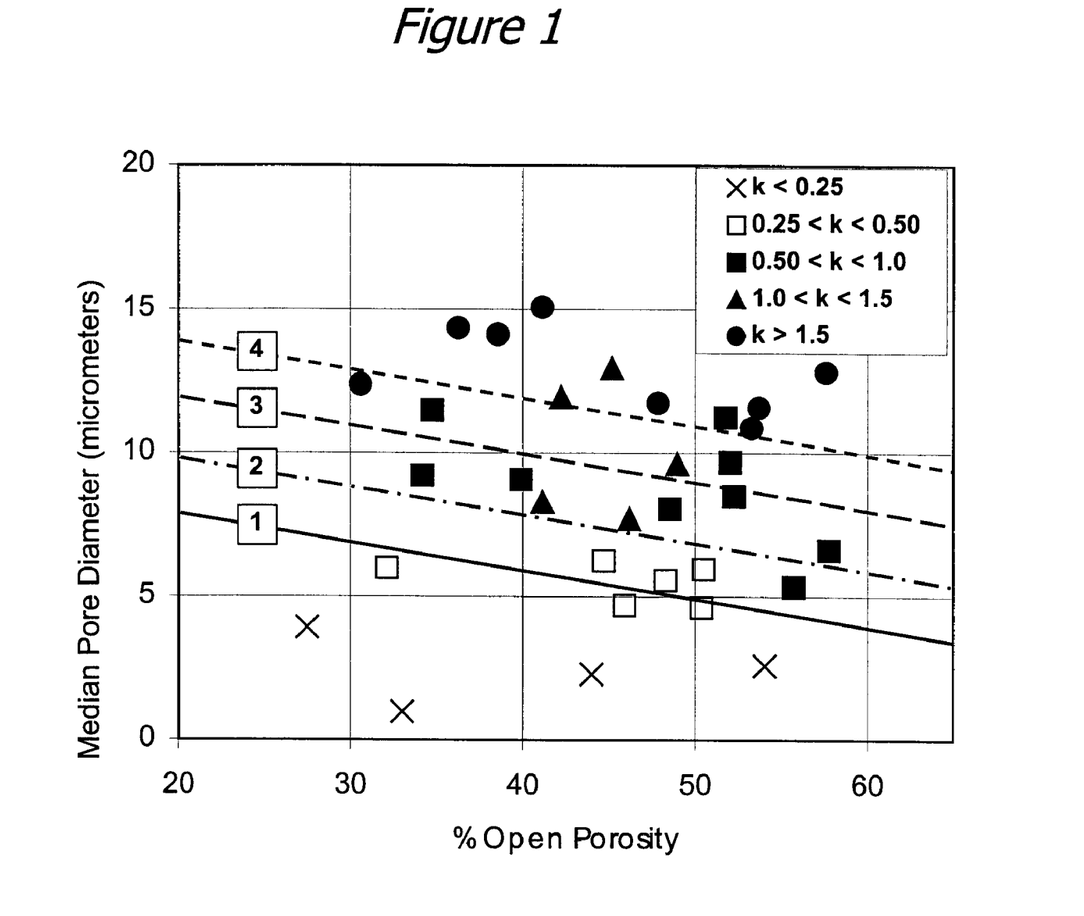
FIG. 1 is a plot of median pore diameter versus percent open porosity for cellular bodies of various compositions categorized according to the permeability values of extruded ribbon of the same compositions fired under the same conditions. Permeability, denoted by "k," is in units of $10^{-12}$ $m^2$.

The open porosity is at least about 20% by volume and preferably less than about 65% to maintain strength. The median pore size of the inventive structures is at least that given by a value defined by the quantity [10−0.10(% open porosity)]. (Note, "percent" or "%" used in a formula means the actual percent number. For example for 40% open porosity, the number in the formula would be "40" and not 0.40.) Thus, for example, when the open porosity of the body is 30%, the median pore diameter must be at least 7 micrometers; when the open porosity is 40%, the median pore diameter is at least 6 micrometers; and when the open porosity is 50%, the median pore diameter is at least 5 micrometers. This relationship is depicted in FIG. 1, which is a plot of median pore diameter versus % open porosity for various examples to be discussed. The line designated as "1" indicates the minimum median pore diameter as a function of % open porosity for porosities ranging from 20% to 65%. Good filtration efficiency is anticipated by maintaining the median pore size below about 75 micrometers.

In accordance with a preferred embodiment, the structures exhibit unique combinations of open porosity and pore sizes. FIG. 1 also shows various boundaries that depict these preferred relationships. For example, the median pore size is preferably equal to or greater than a value defined by the quantity [12−0.10(% open porosity)], as shown by line 2, and more preferably equal to or greater than a value defined by the quantity [14–0.10(% open porosity)], as shown by line 3, and even more preferably equal to or greater than a value defined by the quantity [16–0.10(% open porosity)], as shown by line 4.

In the above cases, the open porosity is preferably at least about 42%.

The permeability of air under an applied pressure through the structure may be expressed by the specific permeability. The value of the specific permeability may be obtained as follows. A sheet-like specimen of the structure having a thickness typically of between 0.01 cm and 0.1 cm is mounted with epoxy onto a disc-shaped sample holder which has a circular opening. The epoxy is applied around the perimeter of the opening such that the sample covers the opening and such that no air can pass through the opening without passing through the sample, and such that the area of the sample through which the air passes is very nearly the same as the area of the circular opening of the sample holder. The sample is then placed in the chamber of an automated porometer and a differential air pressure is applied across the sample. The volumetric air flow on the outlet end of the sample is measured as a function of the pressure applied to the inlet face of the sample. The specific permeability, k, is then computed from the following relation:

$$k = \frac{\eta Q L}{A \Delta P}$$

where $\eta$ is the viscosity of air at room temperature taken as 0.0185 centipoise, L is the thickness of the sample in centimeters, Q is the uniaxial volume flow rate of air through the sample in cubic centimeters per second, A is the area, in square centimeters, through which air is allowed to pass through the sample, approximately equal to the area of the opening of the sample holder, and $\Delta P$ is the differential pressure across the thickness of the sample in units of atmospheres.

Substituting in the relationship $A=\pi D^2/4$, where D is the diameter in centimeters of the area through which air is allowed to pass through the sample, approximately equal to the diameter of the opening in the sample holder, and $\pi$ equals 3.141593, then the permeability is expressed by the relation $$k = \frac{4\eta Q L}{\pi D^2 \Delta P}$$

The specific permeability, also referred to as permeability, is thus expressed in units of $10^{-12}$ m$^2$.

Accordingly, the structures of the present invention exhibit a permeability of at least about $0.25 \times 10^{-12}$ m$^2$, preferably at least about 0.50 cm$^2 \times 10^{-12}$ m$^2$, and more preferably at least about $1.0 \times 10^{-12}$ m$^2$.

Other advantages of the inventive structures include good strength, and high thermal shock resistance, making them suitable for use in harsh environments. The structures exhibit a four-point modulus of rupture as measured on a solid rod of circular cross section of at least about 300 psi, preferably at least about 700 psi, and more preferably at least about 1000 psi. It is preferred that the melting point be greater than 1700° C. and the mean coefficient of thermal expansion from 22° to 1000° C. be between −10 and $+10 \times 10^{-7}$°C.$^{-1}$, resulting in excellent thermal shock resistance.

Inventive bodies may be well suited for use as diesel particulate filters, especially in applications where regeneration of the filter by burning of the carbon soot can result in locally high temperatures within the filter, thus necessitating excellent thermal shock resistance and a high melting point of the filter.

While the structure can have any shape or geometry suitable for a particular application, it is preferred that it be a multicellular structure such as a honeycomb structure. Honeycombs are multicellular bodies having an inlet and outlet end or face, and a multiplicity of cells extending from inlet end to outlet end, the cells having porous walls.

Generally honeycomb cell densities range from about 93 cells/cm$^2$ (600 cells/in$^2$) to about 4 cells/cm$^2$ (25 cells/in$^2$). Typical wall thicknesses are from about 0.07 to about 0.8 mm (about 3 to 30 mils). Examples of honeycombs produced by the process of the present invention, although it is to be understood that the invention is not limited to such, are those having about 31 cells/cm$^2$ (about 200 cells/in$^2$), or about 16 cells/cm$^2$ (about 100 cells/in$^2$) each having wall thicknesses of about 0.25 to 0.64 mm (10 to 25 mils).

It is preferred to have part of the total number of cells plugged to allow better flow through the porous walls. A portion of the cells at the inlet end or face are plugged. The plugging is only at the ends of the cells which is typically to a depth of about 9.5 to 13 mm, although this can vary. A portion of cells on the outlet end but different from those on the inlet face are plugged so that each cell is plugged only at one end. The preferred arrangement is to have every other cell on a given face plugged as in a checkered pattern.

The plugging configuration allows more intimate contact between fluid stream and the porous walls of the structure. A fluid stream flows into the structure through the open cells at the inlet end, through the porous cell walls, and out of the structure through the open cells at the outlet end. These structures are suitable as diesel particulate filters where the plugging pattern is advantageously alternately plugged as described above (checkerboard pattern).

One especially suited formula for use in diesel particulate filtration is $R_{1+(y/2)}Zr_4P_{6-y}Si_yO_{24}$ where $0 \leq y \leq 1.0$ and R is one or more of the metals Ca, Sr, and Ba.

Other suitable filters are cross flow devices such as those disclosed in U.S. Pat. Nos. 4,781,831, 5,009,781, and 5,108,601 which are herein incorporated by reference.

The invention also relates to methods for fabricating high permeability NZP-type ceramic bodies by forming a mixture of coarse particulate raw materials, and optionally sintering aids to further increase strength, and/or pore formers to further increase porosity and/or pore size. Also, other phases such as water, organic solvents, binders, lubricants, and/or plasticizers can be used. The mixture is shaped into a green body, optionally dried, and then fired to form the product structure.

The Raw Materials

The NZP-forming raw materials are (1) metal oxide sources that react to form the NZP phase, and/or (2) partially or completely pre-reacted NZP powder. The general formula or composition of the NZP-phase is $R_xZ_4P_{6-y}Si_yO_{24}$, where the x and y values and the R and Z metals are as described above.

Coarse median particle size of the raw material mixture is necessary for a sufficiently large median pore size and high permeability.

Median particle size is the median particle diameter in micrometers based upon a volumetric distribution. It is determined by a particle size analyzer employing the laser diffraction technique. The volumetrically weighted average of the median particle sizes of the NZP-forming raw material powders that are used in the raw materials combination is at least about 15 micrometers. This average of the median particle sizes provides an indication of the overall coarseness of the combination of the raw materials that are used, based on the median particle sizes of the individual raw materials. The volumetric average of the median particle sizes of the raw materials in a raw materials combination, designated $d_{rm}$, in micrometers, is computed from the following equation:

$$d_{rm} = \frac{(W_A/\rho_A)(d_A) + (W_B/\rho_B)(d_B) + \ldots + (W_n/\rho_n)(d_n)}{(W_A/\rho_A) + (W_B/\rho_B) + \ldots + (W_n/\rho_n)}$$

where $W_i$ is the weight percentage of raw material "i" in the raw material combination, $\rho_i$ is the density of raw material "i" in units of grams/cm$^3$, $d_i$ is the median particle diameter of raw material "i" in micrometers, and the terms in the above equation are computed for each raw material A, B, . . . n used in the raw material combination.

At least about 65% by volume of the totality of the raw material powder particles have a particle diameter of greater than about 11 micrometers. The volume percent greater than 11 micrometers of the totality of the raw materials used in a combination, designated $v_{rm}$, is computed from the following equation:

$$v_{rm} = \frac{(W_A/\rho_A)(v_A) + (W_B/\rho_B)(v_B) + \ldots + (W_n/\rho_n)(v_n)}{(W_A/\rho_A) + (W_B/\rho_B) + \ldots + (W_n/\rho_n)}$$

where $v_i$ is the volume percent of particles coarser than 11 micrometers for raw material "i," other terms are as defined above, and the terms in the above equation are computed for each raw material A, B, . . . n used in the raw material combination.

Some advantageous raw material particle sizes and size distributions, applicable to the totality of the raw material powder particles are (1) at least about 90% by volume of the totality of the raw material powder particles with a particle size of greater than about 11 micrometers, (2) average of the median particle sizes of the raw materials used in the raw materials combination at least about 25 micrometers, and (3) average of the median particle sizes of the raw materials used in the raw materials combination at least about 35 micrometers. For these conditions it is preferred to have no particulate pore former in the mixture.

Some advantageous raw materials are compounds of zirconium and/or phosphorus. When phosphorus compounds are used, it is preferred that the median particle size of the phosphorus compounds be at least about 15 micrometers, preferably at least about 35 micrometers, and more preferably at least about 50 micrometers. Still preferred is to screen about 100%<150 micrometers, and most preferred about 100<100 micrometers. Some preferred compounds are $Zr_2P_2O_9$, $ZrP_2O_7$, $Zr(HPO_4)_{2-y} \cdot xH_2O$, and combinations of these, where $0 \leq y \leq 1$ and $0 \leq x \leq 2$. Also preferred are zirconium phosphate powders composed of one or more crystalline or amorphous phases whose composition can be expressed as $Zr_2P_{2+2y}O_{9+5y}$ where $0 \leq y \leq 1$.

Other advantageous raw materials are sulfates and/or carbonates of calcium, strontium, and/or barium. With these combinations it is preferred that the median particle size of the total charge of the selected compounds be at least about 15 micrometers, more preferably at least about 35 micrometers, even more preferably at least 50 micrometers, and may be in excess of 100 micrometers. Still preferred is to screen about 100%<150 micrometers, and most preferred about 100<100 micrometers.

Still other advantageous raw materials are $CaZrO_3$, $SrZrO_3$, $BaZrO3$, and combinations of these. Here also, with these particular raw materials it is preferred that the median particle size of the total charge of the selected compounds be at least about 15 micrometers, more preferably at least about 35 micrometers, even more preferably at least 50 micrometers, and may be in excess of 100 micrometers. Still preferred is to screen about 100%<150 micrometers, and most preferred about 100<100 micrometers.

In another embodiment, it is advantageous to have as one of the raw materials, zirconium oxide powder having a median particle diameter of at least about 10 micrometers, and more preferably at least 25 micrometers. Still preferred is to screen about 100%<150 micrometers, and most preferred about 100<100 micrometers.

The Sintering Additive

In some instances, it is preferred to have a sintering aid or additive in the mixture. Addition of a sintering aid is sometimes necessary for the body to have adequate strength after firing. Sintering additives have also been found to assist in increasing the median pore diameter. Sintering additives include certain metal oxides, or organic or inorganic compounds that form the metal oxide during heating, which react with the NZP-type phase to promote sintering between the NZP crystal grains in the ceramic, thereby improving the strength of the body. Some suitable sintering additives, although it is to be understood that the invention is not limited to such, are sources of one or more of the metals of magnesium, zinc, calcium, aluminum, lanthanum, titanium, bismuth, and tungsten. It is preferred that the sintering additive, when it is used, be present in the mixture at a level of about 0.05% to 10%, and more preferably about 0.1% to 1% by weight based on the raw material powders.

The Pore Former

A pore former is a fugitive particulate material which evaporates or undergoes vaporization by combustion during drying or heating of the green body to obtain a desired, usually larger porosity and/or coarser median pore diameter than would be obtained otherwise. When a pore former is used, it is advantageous that it be a particulate pore former and be present in an amount of at least about 10% by weight based on the raw materials. In this case the median particle size of the particulate pore former is preferably at least about 10 micrometers. One especially suitable particulate pore former is graphite having a median particle size of at least about 10 micrometers, and more preferably at least 25 micrometers.

The weight percent sintering aid and pore former are computed as:

$$\frac{100 \times \text{weight of sintering aid or pore former}}{\text{weight of NZP-forming raw materials}}$$

The NZP-forming raw materials are mixed together, but extensive milling of the particles during mixing which might substantially reduce the size of the particles in the mixture is to be avoided.

The sintering aid can be added as a powder or liquid form to the mixture of NZP-forming raw materials and further blended with the raw materials.

As much as 60% of a pore-former can also be added to the powder mixture to further increase the permeability of the fired body.

The mixture is optionally mixed with a liquid, binder, lubricant, and plasticizer and shaped into a green body by any method such as injection molding, slip casting, centrifugal casting, pressure casting, tape casting, dry pressing, calendering, roll compaction, extrusion, etc.

The extrusion operation can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die. The extrusion can be vertical or horizontal.

The resulting shaped green structure can then be dried.

It is then heated to a maximum temperature of about 1200° C. to 1750° C. over a period of about 2 to 200 hours, preferably 10 to 100 hours, and held at the maximum temperature for 0.1 to 100 hours, preferably 1 to 30 hours. The firing may be conducted in an electrically heated furnace or gas kiln, or the green structure may be heated by microwave radiation. The partial pressure of oxygen in the firing atmosphere is preferably at least 0.01 atmospheres, and more preferably at least 0.10 atmospheres, especially when the hold temperature is greater than about 1450° C. Higher hold temperatures and longer hold times are advantageous for increasing the strength and median pore size of the structure, and can also reduce the coefficient of thermal expansion.

It is preferred that the structure be plugged as described previously. This can be done by standard methods utilized in making alternately plugged honeycombs. For example, the ends of the alternate channels of the green structure can be plugged with a paste having the same or similar composition to that of the green body, using appropriate amounts of a liquid phase to impart a workable viscosity, optionally with the addition of binders and plasticizers. In this case, the plugged green ware is dried and fired as described above. Alternatively, the green structure without plugs is fired as above. After cooling, alternate channels may be plugged with a paste of NZP-forming raw materials which undergo minimal shrinkage during firing, and refired to a temperature of 12000° C. to 1750° C. to consolidate the plugs, or the alternate channels may be plugged with a cement material which hardens or cures to a refractory material after drying or heating to a low temperature such as less than 600° C.

It is preferred to have diesel particulate filters comprising the inventive structure with a cell density of 150 to 250 cells per square inch and a cell wall thickness of 0.015 to 0.025 inches.

To more fully illustrate the invention, the following non-limiting examples are presented. All parts, portions, and percentages are on a weight basis unless otherwise stated.

All examples except one in the present study have been formulated to have one of the following compositions: $Ba_{1.25}Zr_4P_{5.5}Si_{0.5}O_{24}$ or $Ba_{1.30}Zr_4P_{5.4}Si_{0.6}O_{24}$. Examples made using metal oxide sources were formulated to yield the $Ba_{1.25}Zr_4P_{5.5}Si_{0.5}O_{24}$ composition (Tables 2 to 8). Examples made with pre-reacted powders were of the $Ba_{1.30}Zr_4P_{5.4}Si_{0.6}O_{24}$ composition (Table 9). In example 3-9 (Table 3), strontium was substituted for barium, and the silicon-to-phosphorus ratio in the NZP was increased, to yield the composition $Sr_{1.325}Zr_4P_{5.35}Si_{0.65}O_{24}$. Raw materials and their densities and particle size distributions are listed in Table 1.

Pre-reacted powders consisted either of a fine $Ba_{1.30}Zr_4P_{5.4}Si_{0.6}O_{24}$ powder having a median particle size of 3.2 micrometers, or a coarse $Ba_{1.30}Zr_4P_{5.4}Si_{0.6}O_{24}$ powder which also contained 0.55% MgO. The coarse pre-reacted powder was formed by milling the fine powder with 0.8% $Mg(OH)_2$ in water, spray drying the slurry, and firing the spray dried powder to 1450° C. for 6 hours in a zirconia crucible to form a coarse powder consisting of hard, spheroidal agglomerate type particles.

In examples in which the $Ba_{1.25}Zr_4P_{5.5}Si_{0.5}O_{24}$ phase was formed from metal oxide sources, the sources of barium include fine and coarse $BaZrO_3$ powders (median particle sizes =0.6 and 135 micrometers) and five $BaCO_3$ powders spanning a range of median particle sizes from 1.9 to 121 micrometers. Phosphorus was provided either as zirconium hydrogen phosphate hydrate, $Zr(HPO_4)_2.H_2O$ (median particle size =28 micrometers) or a $ZrP_2O_7$ powder (median particle size =21 micrometers) formed by calcination of the zirconium hydrogen phosphate hydrate powder at 1050° C. In raw material formulations in which all barium was provided as $BaCO_3$, additional $ZrO_2$ beyond that provided by the phosphate source was added as one of four zirconia powders spanning a median particle size from 0.6 to 17 micrometers. Silica was added either as a 3.2 micrometer quartz powder or as a silicone resin dissolved in a dibasic ester solvent. The silicone resin was found to yield 46% $SiO_2$ by weight upon heating in air. The resin was dissolved in dibasic ester (DBE) at a weight ratio of two parts resin to one part solvent. Thus, 8.4 grams of resin/DBE solution contains 5.6 grams of silicone resin, which yields 2.59 grams of $SiO_2$ upon heating in air to vaporize the DBE and pyrolyze the resin to silica. Particle size distributions were measured by a Microtrac™ particle size analyzer employing the laser diffraction technique.

For some examples, fine powders of $Mg(OH)2$, ZnO, or $TiO_2$ were introduced as sintering aids.

Pore forming agents included a graphite having a median particle size of 33 micrometers, pecan shell flour having a median particle size of 32 micrometers, and bleached flour for which the particle size distribution was not measured.

Methyl cellulose in amounts of 5.0 to 10.0 percent by weight based upon the total weight of NZP-forming raw materials+sintering additive+pore former was added as a binder. Sodium stearate was used as a lubricant. Water was used as a solvent, and dibasic ester also served as a solvent for those examples in which silica was introduced as a solution of silicone resin dissolved in dibasic ester. The 8.4 grams of silicone resin+dibasic resin solution required to yield 2.59 grams of silica contributed 2.8 grams of dibasic ester to the total water+dibasic ester solvent mixture.

All dry raw materials, including binders and lubricant, were weighed into a container and dry mixed without milling media to provide some homogenization on a macroscopic scale. The mixtures were then transferred into a stainless steel muller to which distilled water was gradually added in a quantity sufficient to impart plasticity to the mixture. In examples in which silicone resin was employed as a source of silica, the resin/DBE solution was added prior to the addition of the water. The mixture was then extruded into one or more of the following shapes: cylindrical rod having a diameter of about 5/16 inch (0.8 cm); a ribbon having a width of about 1.25 (3.2 cm) inches and a thickness of about 0.020 inches (0.05 cm); and a cylindrical cellular body 1.0 or 1.25 inches (2.5 or 3.2 cm) diameter, having about 200 cells per square inch (31 cells/cm$^2$), and having a wall thickness of about 0.010 to 0.019 inches (0.025 to 0.048 cm); or, in the case of Example 3–9, a cylindrical cellular body 5.7 inches (14.5 cm) diameter, having about 200 cells per square inch (31 cells/cm$^2$), and having a wall thickness of about 0.017 inches (0.043 cm).

The extruded materials were then dried in an oven at 95° C. and cut to desired lengths. Cellular and rod samples were placed on coarse particulate zirconia on a zirconia or alumina pallet or in an alumina saggar box, while ribbon specimens were set on a disc of $Ba_{1.30}Zr_4P_{5.4}Si_{0.6}O_{24}$ that had previously been fired to 1550° C. without a sintering aid. Most samples were fired in an electrically heated furnace at rates ranging from 25° C./hr to 100° C./hr over various temperature intervals to a maximum temperature of 1450° to 1650° C., held for 6 hours, and cooled by shutting off power to the furnace. Several examples were fired in a gas kiln at similar heating rates to 1500° C., held for 6 hours, and cooled by reducing the gas supply to the furnace.

Porosities of selected samples were characterized by mercury porosimetry, except for the examples in Table 2. Porosities for examples 2-1 to 2-5 were estimated by weighing and measuring the dimensions of the fired rod. The bulk density of the rod in grams $cm^{-3}$ was then computed from the relation: bulk density={(4) (weight of rod in grams)/[(length of rod in cm) ($\pi$) (diameter of rod in cm)$^2$]}. The estimated density was compared with a density of 3.44 g/cm$^3$ for a theoretically fully dense sample and the porosity computed from the relation: % porosity=100[1−((estimated density)/3.44)]. Permeability and air flux through a portion of sintered ribbon were measured using an Automated Perm Porometer Version 6.0 (Porous Materials, In., Ithaca, N.Y.). Mean coefficients of thermal expansion from 22° to 1000° C. were measured on rod or cellular specimens using a dilatometer. Four-point flexural strengths were measured on rods. For each example, the average of the median particle sizes of the NZP-forming raw materials in the raw materials combination, and the volume percent of particles greater than 11 micrometers in the totality of the NZP-forming raw materials, were computed as described above.

Secondary phases in the fired cellular bodies were identified by powder x-ray diffractometry. Tables 2 to 8 report the intensity of the monoclinic $BaZrP_2O_8$ (110) reflection at 4.51 Å, the intensity of the monoclinic $ZrO_2$ (111) reflection at 2.835 Å, and the intensity of the tetragonal $ZrSiO_4$ (200) reflection at 3.302 Å, as a percentage of the intensity of the $Ba_{1.25}Zr_4P_{5.5}Si_{0.5}O_{24}$ (116) reflection at 2.935 Å. Although the percent peak heights are not actually equivalent to the weight percentages or volume percentages of the secondary phases in the fired bodies, they do provide a qualitative comparison of the amounts of these phases among the examples.

Example 1 is a comparative example of a commercially available cordierite ceramic used as a diesel particulate filter. This material has a CTE (25–800° C.) of about $5 \times 10^{-7}$° C.$^{-1}$, about 50% porosity, a median pore size of about 12 $\mu$m, a permeability of $0.47 \times 10^{-12}$ m$^2$.

Examples in Table 2 are of the $Ba_{1.25}Zr_4P_{5.5}Si_{0.5}O_{24}$ composition and were prepared from mixtures that do not contain a sintering additive or a pore former. Comparative examples 2-1 to 2-5 demonstrate that fairly well reacted $Ba_{1.25}Zr_4P_{5.5}Si_{0.5}O_{24}$ ceramic bodies with high porosity are achieved from raw material mixtures that utilize a coarse zirconium phosphate or zirconium hydrogen phosphate hydrate powder in combination with silica and barium zirconate or silica, barium carbonate, and zirconia. However, in the absence of a sintering aid, such bodies are extremely weak, with flexural strengths of less than 200 psi, and would not be suitable in filtration applications.

Examples in Table 3 were prepared from mixtures that contain a magnesium hydroxide sintering additive but no pore former. Comparative Examples 3-1 and 3-2 show that addition of 0.8% or 0.7% magnesium hydroxide to raw material combinations of barium carbonate, zirconium hydrogen phosphate hydrate, zirconia, and a silica source results in a large increase in flexural strength. However, addition of this amount of sintering aid also results in a porosity and median pore size which lie outside the range of the present invention, and yield a very low permeability in the case of Example 3-1. Comparative Example 3-3 shows that the use of a calcined zirconium phosphate in place of zirconium hydrogen phosphate hydrate, in combination with a lower amount of sintering aid, results in much less firing shrinkage and a higher porosity. However, the porosity and pore size still lie outside the range of the invention. Inventive Example 3-4 shows that increasing the sintering temperature from 1550° C. to 1650° C. results in coarsening of the median pore size such that the porosity and pore size combination lie within the scope of the invention. Permeability of the ribbon for Example 3-4 is considerably increased relative to Examples 3-1 to 3-3. Inventive Examples 3-5 to 3-7 show that when an especially coarse barium carbonate is used in combination with calcined zirconium phosphate, such that the average of the median particle sizes of the raw materials is greater than 35 micrometers, the percent porosity and median pore size are substantially increased even when the firing temperature is 1550° C. An especially high permeability of about $1.0 \times 10^{-12}$ m$^2$ is achieved when the zirconia powder used as a raw material is also of a coarse median particle size of 17 micrometers. Inventive Example 3-8 demonstrates that a very coarse median pore size and an exceptionally high permeability are obtained when a very coarse barium zirconate powder is used in combination with a coarse zirconium phosphate powder.

In Examples 3-1 to 3-8, the use of a sintering additive is also seen to result in lower amounts of secondary phases. Lower amounts of sintering aid, in combination with a calcined zirconium phosphate source in place of zirconium hydrogen phosphate hydrate and no pore former, result in very low firing shrinkage and better dimensional control over the fired structure. The use of barium zirconate in place of barium carbonate as the barium source actually results in a slight growth of the structure during firing. Thus, it is anticipated that a raw material combination containing both a metal carbonate and a metal zirconate could yield a structure which has essentially no net change in dimension during sintering.

Table 3 also provides inventive Example 3-9 which is a strontium NZP having the composition $Sr_{1.325}Zr_4P_{5.35}Si_{0.65}O_{24}$. This material is seen to have a very high permeability of $2.06 \times 10^{-12}$ m$^2$ without the use of a graphite pore former. Also, CTE and firing shrinkage are very low, making this material especially well suited for use as a diesel particulate filter.

Table 4 illustrates examples in which 0.8% magnesium hydroxide is used as a sintering aid but in which the median pore size and permeability are increased to inventive values by the addition of a graphite pore former to the mixture. When the average of the median particle sizes of the raw materials is 20 to 30 micrometers, and 15 to 30% graphite is added as a pore former, porosities of 38 to 49% and median pore sizes of 7 to 20 micrometers are achieved, and permeabilities of 1.0 to $1.8 \times 10^{-12}$ m$^2$ are obtained. Increasing the sintering temperatures from 1450° to 1650° C. results in a substantial increase in pore size. Flexural strengths range from about 700 to over 1300 psi.

The examples in Table 5 show that further reduction in the amount of magnesium hydroxide sintering aid in combination with a graphite pore former and NZP-forming raw materials for which the average of the median particle sizes is about 25 micrometers results in high porosity, coarse median pore size, and very high permeabilities. Lower amounts of sintering aid also have the desirable effect of yielding lower shrinkage during firing, allowing better dimensional control of the fired structure. The use of a coarse zirconia powder as a raw material in Examples 5-1 and 5-2, whereby the volume percent of particles in the totality of the raw materials is increased to greater than 90%, in combination with 20% graphite, yields exceptionally high permeabilities.

The examples in Table 6 demonstrate that titanium oxide and zinc oxide also serve as sintering aids for $Ba_{1.25}Zr_4P_{5.5}Si_{0.5}O_{24}$ forming raw materials in combination with 30% graphite. Although porosities are less than 40% for these amounts of sintering aids, the coarse pore sizes result in good permeabilities for these bodies, and flexural strengths are high. These sintering additives also serve to promote reaction of the coarse raw materials to form the NZP phase, resulting in low levels of secondary phases.

Table 7 provides examples which show that other pore formers, such as bleached flour and pecan shell flour, in combination with 0.2 to 0.8% magnesium hydroxide as a sintering aid, and using raw materials for which the average of the median particle sizes of the raw materials is 21 to 25 micrometers, yield coarse-porosity, high-permeability sintered structures.

Examples in Table 8 illustrate that sintering may also be conducted in a kiln which is heated by the combustion of natural gas. Example 8-1 shows that the use of 0.8% magnesium hydroxide sintering aid with coarse raw materials and 15% graphite yields a body with high porosity and coarse median pore size when fired at 1500° C. in the gas kiln. Coefficient of thermal expansion is also especially low. Comparative Examples 8-2 and 8-3 show that 0.5% magnesium hydroxide is not sufficient to provide adequate strength when firing is conducted in a gas kiln. While not wishing to be limited by theory, it is believed that the lower oxygen partial pressure in the combustion atmosphere of the gas kiln results in some vaporization of the phosphorus from the NZP structure, possibly reducing the connectivity of the NZP crystal grains in the sintered body.

Examples 9-1 to 9-3 show that sintered bodies with inventive porosities and pore sizes can be obtained by using a coarse pre-reacted barium zirconium silicophosphate powder as the sole or predominate raw material. The pre-reacted powder contained about 0.55% magnesium oxide as an integral part of the coarse particles, and 0.0 to 1.0% magnesium hydroxide was added as additional sintering aid, with 0 to 20% graphite as a pore former. Comparative examples 9-4 to 9-6 show that the use of a fine pre-reacted barium zirconium silicophosphate powder having a median particle diameter of only 3.2 micrometers results in non-inventive bodies having very fine pore size and very low permeability, even when 25% pore former is added to the raw material mixture.

From the forgoing examples, it is apparent that novel, high permeability bodies consisting predominately of an NZP type phase can be fabricated with porosities greater than about 20%, median pore sizes equal to or greater than a value defined by the quantity [10−0.10(% open porosity)], and permeabilities equal to or greater than about 0.25 $cm^2 \times 10^{-12}$ $m^2$. Such bodies are prepared by a method which utilizes coarse starting materials plus a sintering aid, with or without the addition of an organic pore forming phase. High permeability NZP bodies with high melting points and low coefficients of thermal expansion may find application as high temperature filtration devices, such as diesel particulate filters.

It should be understood that while the present invention has been described in detail with respect to certain illustrative and specific embodiments thereof, it should not be considered limited to such but may be used in other ways without departing from the spirit of the invention and the scope of the appended claims.

TABLE 1

Raw materials and pore formers for examples in Tables 2 to 9.

| Raw Material or Pore Former | Nominal Density (g/cm³) | Particles size in micrometers | | | Volume % of particles coarser than 11 micrometers |
|---|---|---|---|---|---|
| | | $d_{10}$ | $d_{50}$ | $d_{90}$ | |
| $BaZrO_3$ A | 6.23 | 0.3 | 0.6 | 1.1 | 0.2 |
| $BaZrO_3$ B | 6.23 | 90.4 | 134.7 | 224.2 | 100.0 |
| $BaCO_3$ A | 4.43 | 0.6 | 1.9 | 10.2 | 8.9 |
| $BaCO_3$ B | 4.43 | 12.9 | 55.8 | 163.0 | 92.5 |
| $BaCO_3$ C | 4.43 | 7.6 | 56.2 | 143.2 | 85.7 |
| $BaCO_3$ D | 4.43 | 12.1 | 53.0 | 114.8 | 911 |
| $BaCO_3$ E | 4.43 | 72.7 | 120.8 | 191.7 | 100.0 |
| $SrCO_3$ | 3.70 | 2.7 | 19.9 | 72.3 | 70.3 |
| $ZrO_2$ A | 5.82 | 0.4 | 0.6 | 1.3 | 0.0 |
| $ZrO_2$ B | 5.82 | 0.4 | 1.3 | 2.6 | 0.0 |
| $ZrO_2$ C | 5.82 | 0.4 | 5.4 | 32.8 | 38.0 |
| $ZrO_2$ D | 5.82 | 11.1 | 17.4 | 26.5 | 90.3 |
| $ZrO_2$ E | 5.82 | 19.0 | 25.7 | 34.6 | 100.0 |
| $Zr(HPO_4)_2 \cdot H_2O$ | 2.75 | 19.1 | 27.6 | 45.6 | 100.0 |
| $ZrP_2O_7$ | 3.14 | 14.7 | 21.1 | 31.2 | 99.4 |
| Crystalline $SiO_2$ Quartz | 2.65 | 0.7 | 3.2 | 18.8 | 24.9 |
| $Ba_{1.3}Zr_4P_{5.4}Si_{0.6}O_{24}$ + 0.55% MgO | 3.44 | 26.8 | 72.3 | 132.2 | 100.0 |
| $Ba_{1.3}Zr_4P_{5.4}Si_{0.6}O_{24}$ | 3.44 | 0.5 | 3.2 | 17.3 | 25.0 |
| Graphite | — | 10.3 | 33.3 | 79.8 | 88.8 |
| Pecan Shell Flour | — | 12.1 | 31.5 | 82.3 | 91.4 |

Value of $d_{10}$ is the particles size in micrometers at which 10 volume percent of the particles are finer. The value of $d_{50}$ is the particles size in micrometers at which 50 volume percent of the particles are finer, and is the same as the median particle diameter. The value of $d_{90}$ is the particles size in micrometers at which 90 volume percent of the particles are finer. The value of $h_{50}$ is the particles size in micrometers at which 50 volume percent of the particles are finer, and is the same as the median particle diameter. The value of $d_{90}$ is the particles size in micrometers at which 90 volume percent of the particles are finer.

TABLE 2

Examples which contain no sintering additive.

| | Example Number | | | | |
|---|---|---|---|---|---|
| | 2-1 | 2-2 | 2-3 | 24 | 2-5 |
| | Example Type | | | | |
| | Comp | Comp | Comp | Comp | Comp |
| NZP-Forming Raw Materials | | | | | |
| $BaZrO_3$ A | 28.80 | 0 | 0 | 0 | 0 |
| $BaCO_3$ A | 0 | 19.65 | 0 | 21.27 | 0 |
| $BaCO_3$ B | 0 | 0 | 19.65 | 0 | 21.27 |
| $Zr(HPO_4)_2 \cdot H_2O$ | 68.70 | 65.69 | 65.69 | 0 | 0 |
| $ZrP_2O_7$ | 0 | 0 | 0 | 62.87 | 62.87 |
| $ZrO_2$ B | 0 | 12.27 | 12.27 | 13.28 | 13.28 |
| $SiO_2$ as Quartz | 2.50 | 2.39 | 2.39 | 2.59 | 2.59 |
| Particle Size Distribution of Raw Materials Combination | | | | | |
| Average of Median Particle Sizes (micrometers) | 22.8 | 21.5 | 29.1 | 15.6 | 24.8 |
| Volume % of Particles > 11 micrometers | 82.6 | 78.2 | 90.1 | 73.3 | 87.6 |
| Binder, Lubricant, and Solvent | | | | | |
| Methylcellulose | 10.0 | 10.0 | 5.0 | 10.0 | 10.0 |
| Sodium Stearate | 1.0 | 1.0 | 1.0 | 1.0 | 1.0 |
| Water | 35.0 | 32.5 | 35.0 | 30.0 | 30.0 |
| Firing Conditions | | | | | |
| Furnace Type | electric | electric | electric | electric | electric |
| Maximum Temperature (° C) | 1550 | 1550 | 1550 | 1550 | 1550 |
| Hold Time (hours) | 6 | 6 | 6 | 6 | 6 |
| Secondary Phases (XRD peak heights, %) | | | | | |
| $BaZrP_2O_8$ | 11 | 13 | 13 | 11 | 16 |
| $ZrO_2$ | 12 | 18 | 19 | 12 | 27 |
| $ZrSiO_4$ | trace | 2 | trace | 0 | 2 |
| Physical Properties of Fired Ware | | | | | |
| % Length Change after Firing | −8.5 | −7.2 | −3.6 | 0.4 | 1.7 |
| % Porosity (from dimensions of rod) | 49 | 52 | 54 | 52 | 60 |
| Four-Point Flexural Strength ($lb/in^2$) | 196 | <50 | <50 | <50 | <50 |

Comp = comparative (non-inventive) example.
Inv. = inventive example.

TABLE 3

Examples with sintering additive and no additional pore former

| Example Number | 3-1 | 3-2 | 3-3 | 3-4 | 3-5 | 3-6 | 3-7 | 3-8 | 3-9 |
|---|---|---|---|---|---|---|---|---|---|
| Example Type | Comp | Comp | Comp | Inv | Inv | Inv | Inv | Inv | Inv |
| NZP-Forming Raw Materials | | | | | | | | | |
| $BaZrO_3$ B | 0 | 0 | 0 | 0 | 0 | 0 | 0 | 31.29 | 0 |
| $BaCO_3$ C | 0 | 0 | 21.27 | 21.27 | 0 | 0 | 0 | 0 | 0 |
| $BaCO_3$ D | 19.65 | 19.48 | 0 | 0 | 0 | 0 | 0 | 0 | 0 |
| $BaCO_3$ E | 0 | 0 | 0 | 0 | 21.27 | 21.27 | 21.27 | 0 | 0 |
| $SrCO_3$ | 0 | 0 | 0 | 0 | 0 | 0 | 0 | 0 | 16.58 |
| $Zr(HPO_4)_2 \cdot H_2O$ | 65.69 | 65.99 | 0 | 0 | 0 | 0 | 0 | 0 | 0 |
| $ZrP_2O_7$ | 0 | 0 | 62.87 | 62.87 | 62.87 | 62.87 | 62.87 | 65.99 | 60.12 |
| $ZrO_2$ A | 0 | 0 | 0 | 0 | 0 | 13.28 | 0 | 0 | 0 |
| $ZrO_2$ B | 12.27 | 0 | 13.28 | 13.28 | 13.28 | 0 | 0 | 0 | 0 |
| $ZrO_2$ D | 0 | 12.16 | 0 | 0 | 0 | 0 | 13.28 | 0 | 0 |
| $ZrO_2$ E | 0 | 0 | 0 | 0 | 0 | 0 | 0 | 0 | 13.84 |
| $SiO_2$ as Quartz | 2.39 | 0 | 0 | 2.59 | 0 | 0 | 0 | 2.72 | 0.55 |
| $SiO_2$ from silicone resin/DBE solution | 0 | 2.59 | 2.59 | 0 | 2.59 | 2.59 | 2.59 | 0 | 2.75 |
| Particle Size Distribution | | | | | | | | | |
| Average of Median Particle Sizes (micrometers) | 28.7 | 30.6 | 25.7 | 24.9 | 37.1 | 37.0 | 38.4 | 41.5 | 21.2 |
| Volume % of Particles >11 micrometers | 89.8 | 98.1 | 88.6 | 86.4 | 91.1 | 91.1 | 98.7 | 96.7 | 93.9 |

TABLE 3-continued

Examples with sintering additive and no additional pore former

| Example Number | 3-1 | 3-2 | 3-3 | 3-4 | 3-5 | 3-6 | 3-7 | 3-8 | 3-9 |
|---|---|---|---|---|---|---|---|---|---|
| Example Type | Comp | Comp | Comp | Inv | Inv | Inv | Inv | Inv | Inv |
| Sintering Additive | | | | | | | | | |
| $Mg(OH)_2$ | 0.8 | 0.7 | 0.4 | 0.4 | 0.5 | 0.5 | 0.5 | 0.5 | 0.65 |
| No Pore Forming Agent | | | | | | | | | |
| Binder, Lubricant, and Solvents | | | | | | | | | |
| Methylcellulose | 7.5 | 7.5 | 7.5 | 7.5 | 7.5 | 7.5 | 7.5 | 7.5 | 6.0 |
| Sodium stearate | 1 | 1 | 1 | 1 | 1 | 1 | 1 | 1 | 0.8 |
| Water | 32.2 | 30.5 | 18.9 | 29.9 | 23.0 | 22.5 | 22.5 | 24.9 | 15.0 |
| Dibasic Ester from silicone/DBE solution | 0 | 0 | 2.8 | 0 | 2.8 | 2.8 | 2.8 | 0 | 2.8 |
| Firing Conditions | | | | | | | | | |
| Furnace Type | electric | electric | electric | electric | electric | electric | electric | electric | electric |
| Maximum Temperature (° C.) | 1450 | 1550 | 1550 | 1650 | 1550 | 1550 | 1550 | 1550 | 1575 |
| Hold Time (hours) | 6 | 6 | 6 | 6 | 6 | 6 | 6 | 6 | 20 |
| Secondary Phases (XRD peak heights, %) | | | | | | | | | |
| $BaZrP_2O_8$ | 3 | — | 4 | — | — | 4 | 5 | 5 | — |
| $ZrO_2$ | 4 | — | Trace | — | — | 10 | 10 | 7 | — |
| $ZrSiO_4$ | 5 | — | 4 | — | — | 3 | 5 | 0 | — |
| Properties of Fired Ware | | | | | | | | | |
| % Length Change after Firing | −15.9 | −14.2 | −0.9 | −8.6 | −2.0 | −3.1 | −1.4 | +2.5 | −1.0 |
| % Open Porosity | 27.5 | 32.1 | 45.9 | 39.9 | 48.3 | 44.7 | 52.2 | 47.9 | 49.0 |
| Total Mercury Intrusion (ml/g) | 0.1110 | 0.1464 | 0.2616 | 0.1899 | 0.3038 | 0.2501 | 0.3135 | 0.2774 | — |
| Median Pore Size (micrometers) | 3.9 | 6.0 | 4.7 | 9.1 | 5.6 | 6.3 | 8.5 | 11.8 | 12.2 |
| Permeability of Ribbon ($10^{-12}$ $m^2$) | 0.11 | 0.40 | 0.29 | 0.92 | 0.43 | 0.30 | 1.01 | 1.59 | 2.00 |
| Mean CTE from 22 to 1000° C. ($10^{-7}$/° C.) | — | — | 11.7 | — | — | 10.5 | 10.4 | 9.5 | 2.7 |
| Four-Point Flexural Strength ($lb/in^2$) | 1817 | 2455 | — | — | 1387 | 1457 | 945 | 777 | — |

TABLE 4

Examples that contain 0.8 wt % $Mg(OH)_2$ and graphite pore former

| Example Number | 4-1 | 4-2 | 4-3 | 4-4 | 4-5 | 4-6 | 4-7 | 4-8 |
|---|---|---|---|---|---|---|---|---|
| Example Type | Inv | Inv | Inv | Inv | Inv | Inv | Inv | Inv |
| NZP-Forming Raw Materials | | | | | | | | |
| $BaCO_3$ A | 0 | 0 | 0 | 19.65 | 0 | 0 | 0 | 0 |
| $BaCO_3$ B | 0 | 0 | 0 | 0 | 21.27 | 21.27 | 0 | 0 |
| $BaCO_3$ C | 19.48 | 19.48 | 21.27 | 0 | 0 | 0 | 21.27 | 21.27 |
| $Zr(HPO_4)_2 \cdot H_2O$ | 65.99 | 65.99 | 0 | 65.69 | 0 | 0 | 0 | 0 |
| $ZrP_2O_7$ | 0 | 0 | 62.87 | 0 | 62.87 | 62.87 | 62.87 | 62.87 |
| $ZrO_2$ B | 12.16 | 12.16 | 13.28 | 12.27 | 13.28 | 13.28 | 13.28 | 13.28 |
| $SiO_2$ as Quartz | 2.37 | 2.37 | 2.59 | 2.39 | 2.59 | 2.59 | 2.59 | 2.59 |
| Particle Size Distribution | | | | | | | | |
| Average of Median Particle Sizes (micrometers) | 29.2 | 29.2 | 24.9 | 21.5 | 24.8 | 24.8 | 24.9 | 24.9 |
| Volume % of Particles >11 micrometers | 89.2 | 89.2 | 86.4 | 78.2 | 87.6 | 87.6 | 86.4 | 86.4 |
| Sintering Additive | | | | | | | | |
| $Mg(OH)_2$ | 0.8 | 0.8 | 0.8 | 0.8 | 0.8 | 0.8 | 0.8 | 0.8 |
| Pore Forming Agent | | | | | | | | |
| Graphite | 30 | 30 | 15 | 30 | 30 | 30 | 30 | 30 |
| Binder, Lubricant, and Solvent | | | | | | | | |
| Methylcellulose | 7.5 | 7.5 | 7.5 | 7.6 | 7.6 | 7.6 | 7.5 | 7.5 |
| Sodium stearate | 1 | 1 | 1 | 0.76 | 0.76 | 0.76 | 1 | 1 |
| Water | 38.2 | 38.2 | 29.8 | 32.5 | 30.6 | 30.6 | 29.9 | 29.9 |

TABLE 4-continued

Examples that contain 0.8 wt % Mg(OH)$_2$ and graphite pore former

| Example Number | 4-1 | 4-2 | 4-3 | 4-4 | 4-5 | 4-6 | 4-7 | 4-8 |
|---|---|---|---|---|---|---|---|---|
| Example Type | Inv | Inv | Inv | Inv | Inv | Inv | Inv | Inv |
| Firing Conditions | | | | | | | | |
| Furnace Type | electric | electric | electric | electric | electric | electric | electric | electric |
| Maximum Temperature (° C.) | 1450 | 1550 | 1450 | 1450 | 1550 | 1650 | 1450 | 1550 |
| Hold Time (hours) | 6 | 6 | 6 | 6 | 6 | 6 | 6 | 6 |
| Secondary Phases in Fired Ware | | | | | | | | |
| BaZrP$_2$O$_8$ | 3 | 4 | — | 0 | 2 | — | — | — |
| ZrO$_2$ | 8 | 11 | — | 5 | 6 | — | — | — |
| ZrSiO$_4$ | 6 | 6 | — | 0 | 4 | — | — | — |
| Properties of Fired Ware | | | | | | | | |
| % Length Change after Firing | −24.4 | −25.8 | −11.7 | −20.2 | −17.7 | −21.1 | −14.9 | −17.4 |
| % Open Porosity | 41.1 | 38.6 | 46.2 | 41.8 | 43.3 | 41.1 | 49.0 | 42.2 |
| Total Mercury Intrusion (ml/g) | 0.1985 | 0.1778 | 0.2434 | 0.2245 | 0.2363 | 0.1969 | 0.2778 | 0.2142 |
| Median Pore Size (micrometers) | 8.3 | 14.1 | 7.7 | 7.0 | 11.8 | 20.4 | 9.6 | 12.0 |
| Permeability (10$^{-12}$ m$^2$) | 1.23 | 1.77 | 1.35 | — | — | — | 1.12 | 1.04 |
| Mean CTE from 22 to 1000° C. (10$^{-7}$/° C.) | | | 9.4 | — | 4.0 | — | — | — |
| Four-Point Flexural Strength (lb/in$^2$) | 1368 | 1203 | 698 | 912 | 838 | — | 823 | — |

TABLE 5

Examples that contain 0.2 to 0.5 wt % Mg(OH)$_2$ and graphite pore former

| Example Number | 5-1 | 5-2 | 5-3 | 5-4 | 5-5 | 5-6 |
|---|---|---|---|---|---|---|
| Example Type | Inv | Inv | Inv | Inv | Inv | Inv |
| NZP-Forming Raw Materials | | | | | | |
| BaCO$_3$ C | 0 | 0 | 21.27 | 21.27 | 21.27 | 21.27 |
| BaCO$_3$ D | 21.27 | 21.27 | 0 | 0 | 0 | 0 |
| ZrP$_2$O$_7$ | 62.87 | 62.87 | 62.87 | 62.87 | 62.87 | 62.87 |
| ZrO$_2$ B | 0 | 0 | 13.28 | 13.28 | 13.28 | 13.28 |
| ZrO$_2$ C | 0 | 13.28 | 0 | 0 | 0 | 0 |
| ZrO$_2$ D | 13.28 | 0 | 0 | 0 | 0 | 0 |
| SiO$_2$ as Quartz | 0 | 0 | 2.59 | 2.59 | 2.59 | 2.59 |
| SiO$_2$ from silicone resin/DBE solution | 2.59 | 2.59 | 0 | 0 | 0 | 0 |
| Particle Size Distribution | | | | | | |
| Average of Median Particle Sizes (micrometers) | 26.4 | 25.4 | 24.9 | 24.9 | 24.9 | 24.9 |
| Volume % of Particles >11 micrometers | 97.2 | 92.8 | 86.4 | 86.4 | 86.4 | 86.4 |
| Sintering Additive | | | | | | |
| Mg(OH)$_2$ | 0.5 | 0.5 | 0.4 | 0.4 | 0.2 | 0.2 |
| Pore Forming Agent | | | | | | |
| Graphite | 20 | 20 | 30 | 15 | 15 | 30 |
| Binder, Lubricant, and Solvents | | | | | | |
| Methylcellulose | 7.5 | 7.5 | 7.5 | 7.5 | 7.5 | 7.5 |
| Sodium stearate | 1 | 1 | 1 | 1 | 1 | 1 |
| Water | 27.6 | 29.3 | 30.0 | 32.9 | 30.0 | 30.0 |
| Dibasic Ester from silicone/DBE solution | 2.8 | 2.8 | 0 | 0 | 0 | 0 |
| Firing Conditions | | | | | | |
| Furnace Type | electric | electric | electric | electric | electric | electric |
| Maximum Temperature (° C.) | 1550 | 1550 | 1550 | 1650 | 1650 | 1650 |
| Hold Time (hours) | 6 | 6 | 6 | 6 | 6 | 6 |
| Secondary Phases in Fired Ware | | | | | | |
| BaZrP$_2$O$_8$ | — | — | — | — | — | — |
| ZrO$_2$ | — | — | — | — | — | — |
| ZrSiO$_4$ | — | — | — | — | — | — |

TABLE 5-continued

Examples that contain 0.2 to 0.5 wt % Mg(OH)₂ and graphite pore former

| Example Number | 5-1 | 5-2 | 5-3 | 5-4 | 5-5 | 5-6 |
|---|---|---|---|---|---|---|
| Example Type | Inv | Inv | Inv | Inv | Inv | Inv |
| Properties of Fired Ware | | | | | | |
| % Length Change after Firing | −6.6 | −9.3 | −9.5 | — | −11.5 | −14.0 |
| % Open Porosity | 57.6 | 41.1 | 53.2 | 45.2 | 48.5 | 53.7 |
| Total Mercury Intrusion (ml/g) | 0.4004 | 0.3908 | 0.4195 | 0.2293 | 0.2832 | 0.3561 |
| Median Pore Size (micrometers) | 12.8 | 15.1 | 10.9 | 13.0 | 8.1 | 11.6 |
| Permeability ($10^{-12}$ m$^2$) | 2.36 | 2.37 | 1.37 | 1.44 | 0.94 | 4.69 |
| Mean CTE from 22 to 1000° C. ($10^{-7}/°$ C.) | — | — | 9.1 | — | — | — |
| Four-Point Flexural Strength (lb/in$^2$) | 337 | 407 | — | 1531 | 863 | — |

TABLE 6

Graphite pore former with sintering additives other than Mg(OH)₂

| Example Number | 6-1 | 6-2 | 6-3 | 6-4 | 6-5 |
|---|---|---|---|---|---|
| Example Type | Inv | Inv | Inv | Inv | Inv |
| NZP-Forming Raw Materials | | | | | |
| BaCO₃ C | 19.48 | 19.48 | 19.48 | 0 | 0 |
| BaCO₃ D | 0 | 0 | 0 | 19.65 | 19.65 |
| Zr(HPO₄)₂·H₂O | 65.99 | 65.99 | 65.99 | 65.69 | 65.69 |
| ZrO₂ B | 12.16 | 12.16 | 12.16 | 12.27 | 12.27 |
| SiO₂ as Quartz | 2.37 | 2.37 | 2.37 | 2.39 | 2.39 |
| Particle Size Distribution | | | | | |
| Average of Median Particle Sizes (micrometers) | 29.2 | 29.2 | 29.2 | 28.7 | 28.7 |
| Volume % of Particles >11 micrometers | 89.2 | 89.2 | 89.2 | 89.8 | 89.8 |
| Sintering Additives | | | | | |
| TiO₂ | 1.0 | 0 | 0 | 0 | 0 |
| ZnO | 0 | 1.0 | 1.0 | 1.0 | 1.0 |
| Pore Forming Agent | | | | | |
| Graphite | 30 | 30 | 30 | 30 | 30 |
| Binder, Lubricant, and Solvent | | | | | |
| Methylcellulose | 7.5 | 7.5 | 7.5 | 7.5 | 7.5 |
| Sodium stearate | 1 | 1 | 1 | 1 | 1 |
| Water | 38.2 | 38.2 | 38.2 | 35.8 | 35.8 |
| Firing Conditions | | | | | |
| Furnace Type | electric | electric | electric | electric | electric |
| Maximum Temperature (° C.) | 1550 | 1450 | 1550 | 1450 | 1550 |
| Hold Time (hours) | 6 | 6 | 6 | 6 | 6 |
| Secondary Phases in Fired Ware | | | | | |
| BaZrP₂O₈ | 4 | 4 | — | 3 | 1 |
| ZrO₂ | 10 | 0 | — | 0 | 0 |
| ZrSiO₄ | 3 | 8 | — | 4 | 2 |
| Properties of Fired Ware | | | | | |
| % Length Change after Firing | −28.0 | −24.8 | −24.5 | −24.5 | −26.2 |
| % Open Porosity | 37.3 | 34.7 | 36.3 | 34.2 | 30.6 |
| Total Mercury Intrusion (ml/g) | 0.1770 | 0.1544 | 0.1626 | 0.1497 | 0.1290 |
| Median Pore Size (micrometers) | 10.8 | 11.5 | 14.4 | 9.2 | 12.4 |
| Permeability ($10^{-12}$ m$^2$) | — | 0.92 | 1.02 | 0.92 | 2.59 |
| Mean CTE from 22 to 1000° C. ($10^{-7}/°$ C.) | — | — | — | — | — |
| Four-Point Flexural Strength (lb/in$^2$) | 1855 | 2125 | 1509 | 2712 | 2386 |

TABLE 7

Mg(OH)$_2$ sintering additive with pore formers other than graphite

| Example Number | 7-1 | 7-2 | 7-3 | 7-4 | 7-5 | 7-6 |
|---|---|---|---|---|---|---|
| Example Type | Inv | Inv | Inv | Inv | Inv | Inv |
| NZP-Forming Raw Materials | | | | | | |
| BaCO$_3$ A | 19.65 | 0 | 0 | 0 | 0 | 19.65 |
| BaCO$_3$ B | 0 | 0 | 21.27 | 21.27 | 21.27 | 0 |
| BaCO$_3$ C | 0 | 21.27 | 0 | 0 | 0 | 0 |
| Zr(HPO$_4$)$_2$·H$_2$O | 65.69 | 0 | 0 | 0 | 0 | 65.69 |
| ZrP$_2$O$_7$ | 0 | 62.87 | 62.87 | 62.87 | 62.87 | 0 |
| ZrO$_2$ B | 12.27 | 13.28 | 13.28 | 13.28 | 13.28 | 12.27 |
| SiO$_2$ as Quartz | 2.39 | 2.59 | 2.59 | 2.59 | 2.59 | 2.39 |
| Particle Size Distribution | | | | | | |
| Average of Median Particle Sizes (micrometers) | 21.5 | 24.9 | 24.8 | 24.8 | 24.8 | 21.5 |
| Volume % of Particles >11 micrometers | 78.2 | 86.4 | 87.6 | 87.6 | 87.6 | 78.2 |
| Sintering Additive | | | | | | |
| Mg(OH)$_2$ | 0.8 | 0.8 | 0.8 | 0.8 | 0.8 | 0.2 |
| Pore Forming Agent | | | | | | |
| Bleached Flour | 30 | 30 | 0 | 0 | 0 | 0 |
| Pecan Shell Flour | 0 | 0 | 30 | 30 | 30 | 30 |
| Binder, Lubricant, and Solvent | | | | | | |
| Methylcellulose | 7.6 | 7.5 | 7.6 | 7.6 | 7.6 | 7.6 |
| Sodium stearate | 0.76 | 1 | 1 | 1 | 1 | 1 |
| Water | 32.5 | 27.4 | 34.4 | 34.4 | 34.4 | 40.3 |
| Firing Conditions | | | | | | |
| Furnace Type | electric | electric | electric | electric | electric | electric |
| Maximum Temperature (° C.) | 1450 | 1450 | 1450 | 1550 | 1650 | 1550 |
| Hold Time (hours) | 6 | 6 | 6 | 6 | 6 | 6 |
| Secondary Phases in Fired Ware | | | | | | |
| BaZrP$_2$O$_8$ | 3 | — | — | — | — | — |
| ZrO$_2$ | 8 | — | — | — | — | — |
| ZrSiO$_4$ | Trace | — | — | — | — | — |
| Properties of Fired Ware | | | | | | |
| % Length Change after Firing | −15.7 | −14.0 | — | — | −20.1 | — |
| % Open Porosity | 48.8 | 51.7 | 52.0 | 41.3 | 32.9 | 50.5 |
| Total Mercury Intrusion (ml/g) | 0.2917 | 0.3172 | 0.327 | 0.2155 | 0.14 | 0.3186 |
| Median Pore Size (micrometers) | 6.9 | 11.3 | 9.7 | 12.3 | 19.8 | 6.0 |
| Permeability ($10^{-12}$ m$^2$) | — | 0.92 | 0.63 | — | — | 0.27 |
| Mean CTE from 22 to 1000° C. ($10^{-7}$/° C.) | — | — | — | — | — | — |
| Four-Point Flexural Strength (lb/in$^2$) | 1198 | — | 547 | — | — | — |

TABLE 8

Examples fired in a natural gas kiln.

| | Example Number | | | |
|---|---|---|---|---|
| | 8-1 | 8-2 | 8-3 | 8-4 |
| | Example Type | | | |
| | Inv | Inv | Comp | Comp |
| NZP-Forming Raw Materials | | | | |
| BaCO$_3$ C | 21.27 | 21.27 | 21.27 | 21.27 |
| ZrP$_2$O$_7$ | 62.87 | 62.87 | 62.87 | 62.87 |
| ZrO$_2$ B | 13.28 | 13.28 | 13.28 | 13.28 |
| SiO$_2$ as Quartz | 0 | 2.59 | 2.59 | 0 |
| SiO$_2$ from silicone resin/DBE solution | 2.59 | 0 | 0 | 2.59 |
| Particle Size Distribution | | | | |
| Average of Median Particle Sizes (micrometers) | 25.7 | 24.9 | 24.9 | 25.7 |
| Volume % of Particles > 11 micrometers | 88.6 | 86.4 | 86.4 | 88.6 |

TABLE 8-continued

Examples fired in a natural gas kiln.

| | Example Number | | | |
|---|---|---|---|---|
| | 8-1 | 8-2 | 8-3 | 8-4 |
| | Example Type | | | |
| | Inv | Inv | Comp | Comp |
| Sintering Additives | | | | |
| Mg(OH)$_2$ | 0.4 | 0.8 | 0.5 | 0.5 |
| Pore Forming Agent | | | | |
| Graphite | 0 | 15 | 10 | 10 |
| Binder, Lubricant, and Solvents | | | | |
| Methylcellulose | 7.5 | 7.5 | 7.5 | 7.5 |
| Sodium stearate | 1 | 1 | 1 | 1 |
| Water | 18.9 | 29.8 | 27.1 | 20.9 |
| Dibasic Ester from silicone/DBE solution | 2.8 | 0 | 0 | 2.8 |
| Firing Conditions | | | | |
| Furnace Type | gas | gas | gas | gas |
| Maximum Temperature (° C.) | 1500 | 1500 | 1500 | 1500 |
| Hold Time (hours) | 6 | 6 | 6 | 6 |
| Secondary Phases in Fired Ware | | | | |
| BaZrP$_2$O$_8$ | — | 11 | — | — |
| ZrO$_2$ | — | 14 | — | — |
| ZrSiO$_4$ | — | 12 | — | — |
| Properties of Fired Ware | | | | |
| % Length Change after Firing | 0.0 | — | -2.9 | -0.2 |
| % Open Porosity | 50.3 | 46.1 | 57.7 | 55.7 |
| Total Mercury Intrusion (ml/g) | 0.2972 | 0.2554 | 0.4011 | 0.3695 |
| Median Pore Size (micrometers) | 4.6 | 8.2 | 6.6 | 5.3 |
| Permeability ($10^{-12}$ m$^2$) | 0.36 | — | 0.74 | 0.71 |
| Mean CTE from 22 to 1000° C. ($10^{-7}$/° C.) | — | 1.9 | — | — |
| Four-Point Flexural Strength (lb/in$^2$) | 365 | — | <200 | 193 |

TABLE 9

Examples made with pre-reacted barium zirconium silicophosphate powders

| Example Number | 9-1 | 9-2 | 9-3 | 9-4 | 9-5 | 9-6 |
|---|---|---|---|---|---|---|
| Example Type | Inv | Inv | Inv | Comp | Comp | Comp |
| NZP-Forming Raw Materials | | | | | | |
| Ba$_{1.3}$Zr$_4$P$_{5.4}$Si$_{0.6}$O$_{24}$ + 0.55% MgO | 100 | 95 | 100 | 0 | 0 | 0 |
| Ba$_{1.3}$Zr$_4$P$_{5.4}$Si$_{0.6}$O$_{24}$ | 0 | 5 | 0 | 100 | 100 | 100 |
| Particle Size Distribution | | | | | | |
| Average of Median Particle Sizes (micrometers) | 72.3 | 68.8 | 72.3 | 3.2 | 3.2 | 3.2 |
| Volume % of Particles >11 micrometers | 100.0 | 96.3 | 100.0 | 25.0 | 25.0 | 25.0 |
| Additional Sintering Additive | | | | | | |
| Mg(OH)$_2$ | 0.8 | 1.0 | 0 | 0 | 0 | 0 |
| Pore Forming Agent | | | | | | |
| Bleached Flour | 0 | 0 | 0 | 0 | 0 | 25 |
| Graphite | 20 | 20 | 0 | 0 | 25 | 0 |
| Binder and Lubricant | | | | | | |
| Methylcellulose | 7.5 | 7.5 | 7.5 | 5 | 5 | 5 |
| Sodium stearate | 1 | 1 | 1 | 1 | 1 | 1 |
| Firing Conditions | | | | | | |
| Furnace Type | electric | electric | electric | electric | electric | electric |
| Maximum Temperature (° C.) | 1450 | 1550 | 1550 | 1550 | 1550 | 1550 |
| Hold Time (hours) | 6 | 6 | 6 | 6 | 6 | 6 |

TABLE 9-continued

Examples made with pre-reacted barium zirconium silicophosphate powders

| Example Number | 9-1 | 9-2 | 9-3 | 9-4 | 9-5 | 9-6 |
|---|---|---|---|---|---|---|
| Example Type | Inv | Inv | Inv | Comp | Comp | Comp |
| Properties of Fired Ware | | | | | | |
| % Open Porosity | 43.5 | 31.3 | 40.4 | 33.0 | 44.0 | 54.0 |
| Median Pore Size (micrometers) | 20.7 | 18.0 | 9.1 | 1.0 | 2.3 | 2.6 |
| Permeability ($10^{-12}$ m$^2$) | — | — | — | 0.015 | 0.052 | 0.087 |
| Mean CTE from 22 to 1000° C. ($10^{-7}$/° C.) | — | — | — | — | — | 1.0 |

What is claimed is:

1. A structure comprising predominately an NZP-type phase having the general formula $R_xZ_4P_{6-y}Si_yO_{24}$, wherein $0 \leq x \leq 8$, $0 \leq y \leq 6$, R is selected from the group consisting of Li, Na, K, Rb, Cs, Mg, Ca, Sr, Ba, Y, lanthanides, and combinations thereof, Z is selected from the group consisting of Zr, Ti, Nb, Ta, Y, lanthanides, and combinations thereof, and optionally a sintering additive, and having an open porosity of at least about 20% by volume as measured by mercury porosimetry, a median pore diameter in micrometers of equal to or greater than a value defined by the quantity [10−0.10(% open porosity)] as measured by mercury porosimetry, and a four-point modulus of rupture as measured on a solid rod of circular cross section of at least about 300 psi.

2. A structure of claim 1 wherein said median pore diameter is less than about 75 micrometers.

3. A structure of claim 1 wherein the melting point of said structure is greater than about 1700° C.

4. A structure of claim 1 wherein the mean coefficient of thermal expansion of said structure from 22° C. to 1000° C. is about $-10 \times 10^{-7}$ C.$^{-1}$ to $+10 \times 10^{-7}$ C.$^{-1}$.

5. A structure of claim 1 wherein the median pore diameter in micrometers is equal to or greater than a value defined by the quantity [12−0.10(% open porosity)].

6. A structure of claim 5 wherein the open porosity is at least 42% by volume.

7. A structure of claim 1 wherein the median pore diameter in micrometers is equal to or greater than a value defined by the quantity [14×0.10(% open porosity)].

8. A structure of claim 7 wherein the open porosity is at least 42% by volume.

9. A structure of claim 1 wherein the median pore diameter in micrometers is equal to or greater than a value defined by the quantity [16−0.10(% open porosity)].

10. A structure of claim 9 wherein the open porosity is at least 42% by volume.

11. A structure of claim 1 wherein the permeability of a 0.01 cm to 0.10 cm thick sheet of the structure is at least about $0.25 \times 10^{-12}$ m$^2$.

12. A structure of claim 11 wherein the permeability is at least about $0.50 \times 10^{-12}$ m$^2$.

13. A structure of claim 12 wherein the permeability is at least about $1.0 \times 10^{-12}$ m$^2$.

14. A structure of claim 13 wherein the permeability is at least about $2.0 \times 10^{-12}$ m$^2$.

15. A structure of claim 1 wherein the four-point modulus of rupture as measured on a solid rod of circular cross section is at least about 700 psi.

16. A structure of claim 15 wherein the four-point modulus of rupture as measured on a solid rod of circular cross section is at least about 1000 psi.

17. A structure of claim 1 comprising a sintering additive that is an oxide source of metals selected from the group consisting of magnesium, zinc, calcium, aluminum, lanthanum, titanium, bismuth, tungsten, and combinations thereof.

18. A structure of claim 17 wherein the sintering additive makes up about 0.05% to 1.0% by weight of the structure.

19. A structure of claim 1 having the shape of a honeycomb, said honeycomb having an inlet and outlet end and a multiplicity of cells extending from inlet end to outlet end, the cells having porous walls, wherein part of the total number of cells at the inlet end are plugged along a portion of their lengths, and the remaining part of cells that are open at the inlet end are plugged at the outlet end along a portion of their lengths, so that a fluid stream passing through the cells of the honeycomb from inlet end to outlet end flows into the open cells, through the cell walls, and out of the structure through the open cells at the outlet end.

20. A method of removing particulates from a fluid stream, the method comprising passing the fluid stream through the open cells at the inlet end of the honeycomb of claim 19, through the cell walls, and out of the structure through the open cells at the outlet end, whereby said particulates are removed from the fluid stream and are retained on said honeycomb.

21. A structure of claim 19 wherein said structure is for filtering particulates from diesel engine exhaust.

22. A diesel particulate filter comprising the structure of claim 1 having the shape of a honeycomb, said honeycomb having an inlet and outlet end and a multiplicity of cells extending from inlet end to outlet end, the cells having porous walls, wherein part of the total number of cells at the inlet end are plugged along a portion of their lengths, and the remaining part of cells that are open at the inlet end are plugged at the outlet end along a portion of their lengths, so that a fluid stream passing through the cells of the honeycomb from inlet end to outlet end flows into the open cells, through the cell walls, and out of the structure through the open cells at the outlet end, said structure comprising a composition having the formula $R_{1+(y/2)}Z_4P_{6-y}Si_yO_{24}$ where $0 \leq y \leq 1.0$ and R is selected from the group consisting of Ca, Sr, Ba, and combinations thereof.

23. A method of making a ceramic structure, the method comprising:

a) forming a mixture comprising NZP-forming raw material powders selected from the group consisting of metal oxide sources capable of reacting to form a reaction product comprising an NZP-type phase having the general formula $R_xZ_4P_{6-y}Si_yO_{24}$ and pre-reacted powder having said general formula, and combinations thereof, wherein in said general formula, $0 \leq x \leq 8$, $0 \leq y \leq 6$, R is selected from the group consisting of Li, Na, K, Rb, Cs, Mg, Ca, Sr, Ba, Y, lanthanides, and combinations thereof, Z is selected from the group consisting of Zr, Ti, Nb, Ta, Y, lanthanides, and combinations thereof, the volumetric average of the median particle diameters of the raw material powders in the raw materials combination, computed by multiplying the median particle diameter of each raw material powder by the volume fraction of that raw material in the raw materials combination and then taking a summation, is at least about 15 micrometers, and at least 65 percent by volume of the totality of the raw material particles are greater than about 11 micrometers;

b) shaping the mixture into a green structure; and c) firing the green structure to produce a fired structure having an NZP-type phase wherein the structure has an open porosity as measured by mercury porosimetry of at least about 20% by volume, and a median pore diameter in micrometers as measured by mercury porosimetry of at least a value defined by the quantity [10−0.10(% open porosity)].

24. A method of claim 23 wherein the mixture comprises a first set of additional components selected from the group consisting of sintering aid, pore former, and combinations thereof.

25. A method of claim 24 wherein a sintering additive is present in the mixture, and is an oxide source of metals selected from the group consisting of magnesium, zinc, calcium, aluminum, lanthanum, titanium, bismuth, tungsten, and combinations thereof.

26. A method of claim 24 wherein a sintering additive is present in the mixture at a level of about 0.05% to 10% by weight based on the raw material powders.

27. A method of claim 26 wherein the sintering additive is present in the mixture at a level of about 0.1% to 1% by weight based on the raw material powders.

28. A method of claim 24 wherein a particulate pore former is present in the mixture in an amount of at least about 10% by weight based on the raw material powders.

29. A method of claim 28 wherein the median particle diameter of the particulate pore former is at least about 10 micrometers.

30. A method of claim 29 wherein the particulate pore former is graphite.

31. A method of claim 23 wherein at least about 90% by volume of the totality of raw material particles are greater than about 11 micrometers.

32. A method of claim 31 wherein no particulate pore former is present in the mixture.

33. A method of claim 23 wherein the volumetric average of the median particle diameters of the raw material powders in the raw materials combination is at least about 25 micrometers.

34. A method of claim 33 wherein no particulate pore former is present in the mixture.

35. A method of claim 23 wherein the volumetric average of the median particle diameters of the raw material powders in the raw materials combination is at least about 35 micrometers.

36. A method of claim 35 wherein no particulate pore former is present in the mixture.

37. A method of claim 23 wherein the mixture comprises a second set of additional components selected from the group consisting of water, organic solvents, binders, lubricants, plasticizers, and combinations thereof.

38. A method of claim 23 wherein said raw materials comprise compounds of metals selected from the group consisting of zirconium, phosphorus, and combinations thereof.

39. A method of claim 38 wherein phosphorus compounds are included in the mixture and have a median particle diameter of at least about 15 micrometers.

40. A method of claim 39 wherein the phosphorus compounds have a median particle diameter of at least about 35 micrometers.

41. A method of claim 40 wherein the phosphorus compounds have a median particle diameter of at least about 50 micrometers.

42. A method of claim 38 wherein the raw materials particle sizes are about 100%<150 micrometers.

43. A method of claim 42 wherein the raw materials particle sizes are about 100%<150 micrometers.

44. A method of claim 40 wherein said compounds are selected from the group consisting of $Zr_2P_2O_9$, $ZrP_2O_7$, $Zr_2P_{2+2y}O_{9+5y}$, $Zr(HPO_4)_{2-y} \cdot xH_2O$ and combinations thereof, wherein $0 \leq y \leq 1$ and $0 \leq x \leq 2$.

45. A method of claim 25 wherein the NZP-forming raw materials comprise compounds selected from the group consisting of calcium carbonate, calcium sulfate, strontium carbonate, strontium sulfate, barium carbonate, barium sulfate, and combinations thereof.

46. A method of claim 45 wherein the median particle diameter of the total of the selected compounds is at least about 15 micrometers.

47. A method of claim 46 wherein the median particle diameter of the total of the selected compounds is at least about 35 micrometers.

48. A method of claim 47 wherein the median particle diameter of the total of the selected compounds is at least about 50 micrometers.

49. A method of claim 45 wherein the raw materials particle sizes are about 100%<150 micrometers.

50. A method of claim 49 wherein the raw materials particle sizes are about 100%<150 micrometers.

51. A method of claim 23 wherein said NZP-forming raw materials comprise compounds selected from the group consisting of CaZrO3, $SrZrO_3$, $BaZrO_3$, and combinations thereof.

52. A method of claim 51 wherein the median particle diameter of the total of the selected compounds is at least about 15 micrometers.

53. A method of claim 52 wherein the median particle diameter of the total of the selected compounds is at least about 35 micrometers.

54. A method of claim 53 wherein the median particle diameter of the total of the selected compounds is at least about 50 micrometers.

55. A method of claim 54 wherein the median particle diameter of the total of the selected compounds is at least about 100 micrometers.

56. A method of claim 23 wherein at least one of said NZP-forming raw materials is zirconium oxide powder having a median particle diameter of at least about 10 micrometers.

57. A method of claim 51 wherein the raw materials particle sizes are about 100%<150 micrometers.

58. A method of claim 57 wherein the raw materials particle sizes are about 100%<150 micrometers.

59. A method of claim 23 wherein the firing temperature is about 1200° C. to 1750° C.

60. A method of claim 23 wherein the mixture is shaped by extrusion.

61. A method of claim 60 wherein the mixture is extruded into a honeycomb structure having an inlet and outlet end and a multiplicity of cells extending from inlet end to outlet end, the cells having porous walls.

62. A diesel particulate filter comprising the structure of claim 1 having the shape of a honeycomb, said honeycomb having an inlet and outlet end and a multiplicity of cells extending from inlet end to outlet end, the cells having porous walls, wherein part of the total number of cells at the inlet end are plugged along a portion of their lengths, and the remaining part of cells that are open at the inlet end are plugged at the outlet end along a portion of their lengths, so that a fluid stream passing through the cells of the honeycomb from inlet end to outlet end flows into the open cells, through the cell walls, and out of the structure through the open cells at the outlet end, said structure comprising a composition having the formula $R_{1+(y/2)}Z_4P_{6-y}Si_yO_{24}$ where $0 \leq y \leq 1.0$ and R is selected from the group consisting of Ca, Sr, Ba, and combinations thereof, wherein said filter has a cell density of 150 to 250 cells per square inch and a cell wall thickness of 0.015 to 0.025 inches.

* * * * *

UNITED STATES PATENT AND TRADEMARK OFFICE
CERTIFICATE OF CORRECTION

PATENT NO.   : 6,413,895 B1
DATED        : July 2, 2002
INVENTOR(S)  : Merkel

It is certified that error appears in the above-identified patent and that said Letters Patent is hereby corrected as shown below:

Column 25,
Line 43, "[14x0.10(% open porosity)]", should be -- [14 - 0.10(% open porosity)] --.

Column 28,
Line 44, "CaZrO3" should be -- $CaZrO_3$ --.

Signed and Sealed this

Fourth Day of February, 2003

JAMES E. ROGAN
*Director of the United States Patent and Trademark Office*